Patented Aug. 18, 1925.

1,550,534

UNITED STATES PATENT OFFICE.

RICHARD GESING AND RUDOLF REYHER, OF OFFENBACH-ON-THE-MAIN, GERMANY, ASSIGNORS TO CHEMISCHE FABRIK GREISHEIM-ELEKTRON, OF FRANKFORT-ON-THE-MAIN, GERMANY, A CORPORATION.

GREEN-BLUE DYESTUFFS OF THE TRIPHENYLMETHANE SERIES, FAST TO ALKALI.

No Drawing.    Application filed May 22, 1925.   Serial No. 32,184.

*To all whom it may concern:*

Be it known that we, RICHARD GESING and RUDOLF REYHER, both citizens of the German Empire, and residents of Offenbach-on-the-Main, Germany, have invented certain new and useful Improvements in Green-Blue Dyestuffs of the Triphenylmethane Series, Fast to Alkali, of which the following is a specification.

The present invention relates to new green-blue dyestuffs of the triphenylmethane series, fast to alkali, which are sulfonated and halogenated derivatives of the dibenzyl-dialkyldiaminotriphenylmethan - ortho - sulfonic acid, corresponding in the state of the free acids probably the general formula:

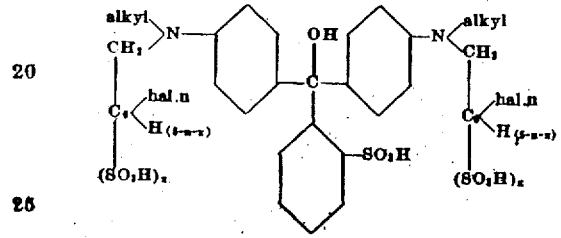

wherein $x$ and $n$ represent numbers less than 3, which dyestuffs are when dry blue powders of a metallic lustre, soluble in water to a beautiful blue solution. The new dyestuffs may be obtained by condensing one molecular proportion of ortho-sulfobenzaldehyde with two molecular proportions of alkylbenzylarylamins, which are substituted in the benzyl residue by halogens, particularly by chlorine and sulfonic groups, and by oxidizing subsequently the products of condensation. As such alkylbenzylarylamins, where on sulfonating the sulfonic groups enter in the benzylresidue, may be used: ortho-, meta-, para-chlorobenzylethylanilin, 2.4- and 2.6-dichlorobenzylethylanilin. In the same manner the bromated derivatives and the derivatives of benzylmethylanilin may be used.

Dyestuffs of the present type, but not containing halogen atoms, are already known, the new halogenated dyestuffs are distinguished from the not halogenated especially by the purity of the shade.

The following examples illustrate the nature of the invention, the parts being by weight:

*Example 1.*

Ortho-chlorobenzylethylanilin, which is obtained in the usual manner from ortho-chlorobenzylchloride and monoethylanilin, is sulfonated by dissolving one part of the base in one to two parts of sulfuric acid, monohydrated acid, and stirring, while cold, with two equivalents of $SO_3$ in the form of oleum, until solubility in alkali has taken place. In this manner one sulfonic group enters in the benzylresidue. The new sulfonic acid forms a white powder, very little soluble in water, easily soluble in alkalies. 65 parts of the sulfonic acid are boiled with 23 parts of ortho-sulfobenzaldehyde (of 90 per cent strength) in aqueous solution for 24 hours under reflux and the leuco-acid, thus obtained, is oxidized in acid solution with peroxid of lead into the dyestuff.

The lead being separated, the dyestuff having in the form of the free acid probably the formula:

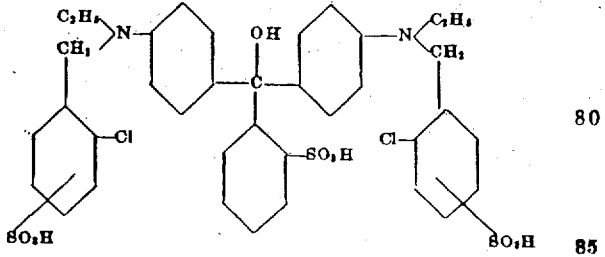

is salted out and dried. It dyes wool in blue shades of an especial purity and clearness, the dye-bath being more exhausted than the dye-bath of the corresponding dyestuff, which is free of chlorine. In the same manner by starting from meta- and para-chlorosulfobenzylethylanilin, also white powders, very little soluble in water and easily soluble in alkalies, the corresponding dyestuffs are obtained, having the same valuable properties.

*Example 2.*

Starting from 2.6-dichlorobenzylethylanilin and using 72 parts of the sulfonic acid for condensing with 23 parts of ortho-sulfobenzaldehyde, according to the same method a dyestuff is obtained dyeing wool in a little more greenish blue shade of an especial purity and clearness.

In the same manner the sulfonic acid of 2.4-dichlorobenzylethylanilin may be used. All the mentioned sulfonic acids have the same aspect and the same properties.

Now what we claim and desire to secure by Letters Patent is the following:

1. As new compounds green-blue dyestuffs of the triphenylmethan series, fast to alkali, which are sulfonated and halogenated derivatives of dibenzyl-dialkyl-diaminotriphenylmethan - ortho - sulfonic acid, corresponding in the state of the free acids probably to the general formula:

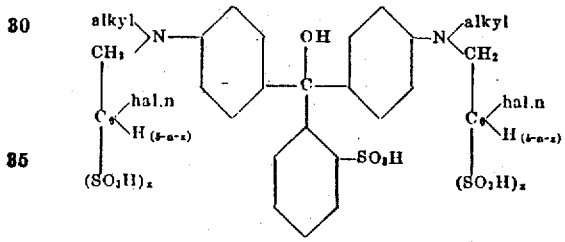

wherein $x$ and $n$ represent numbers less than 3, which dyestuffs are when dry blue powders of a metallic lustre, soluble in water to a beautiful blue solution and dyeing wool in especially pure and clear shades, which dyestuffs may be obtained by condensing one molecular proportion of ortho-sulfobenzaldehyde with two molecular proportions of alkylbenzylarylamins, which are substituted in the benzyl residue by halogens and sulfonic groups, and by oxidizing subsequently the products of condensation.

2. As new compounds green-blue dyestuffs of the triphenylmethan-series, fast to alkali, which are sulfonated and chlorinated derivatives of the dibenzyl-dialkyldiamino-triphenylmethan - ortho - sulfonic acid, corresponding probably in the state of the free acids to the general formula:

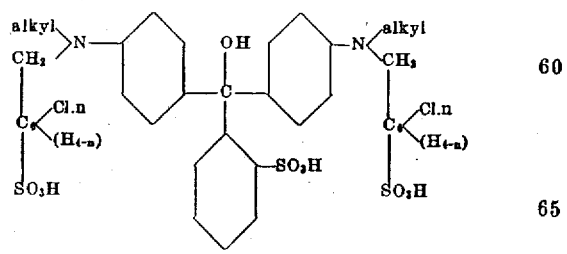

wherein $n$ represent a number less than 3, which dyestuffs are when dry blue powders of a metallic lustre, soluble in water to a beautiful blue solution and dyeing wool in especially pure and clear shades, which dyestuffs may be obtained by condensing one molecular proportion of ortho-sulfobenzaldehyde with two molecular proportions of alkylbenzylarylamins, which are substituted in the benzyl residue by chlorine and sulfonic groups, and by oxidizing subsequently the products of condensation.

3. As new compound a green-blue dyestuff of the triphenylmethan series, fast to alkali, having in the state of the free acid probably the formula:

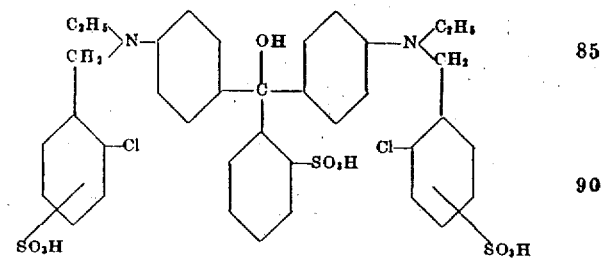

which dyestuff is when dry a blue powder of a metallic lustre, soluble in water to a beautiful blue solution and dyeing wool in especially pure and clear shades, which dyestuff may be obtained by condensing one molecular proportion of ortho-sulfobenzaldehyde with two molecular proportions of ortho-chlorosulfobenzylethylanilin and by oxidizing subsequently the product of condensation.

In testimony, that we claim the foregoing as our invention, we have signed our names, this 11th day of May 1925.

RICHARD GESING.
RUDOLF REYHER.

manner by starting from meta- and para-chlorosulfobenzylethylanilin, also white powders, very little soluble in water and easily soluble in alkalies, the corresponding dyestuffs are obtained, having the same valuable properties.

*Example 2.*

Starting from 2.6-dichlorobenzylethylanilin and using 72 parts of the sulfonic acid for condensing with 23 parts of ortho-sulfobenzaldehyde, according to the same method a dyestuff is obtained dyeing wool in a little more greenish blue shade of an especial purity and clearness.

In the same manner the sulfonic acid of 2.4-dichlorobenzylethylanilin may be used. All the mentioned sulfonic acids have the same aspect and the same properties.

Now what we claim and desire to secure by Letters Patent is the following:

1. As new compounds green-blue dyestuffs of the triphenylmethan series, fast to alkali, which are sulfonated and halogenated derivatives of dibenzyl-dialkyl-diaminotriphenylmethan - ortho - sulfonic acid, corresponding in the state of the free acids probably to the general formula:

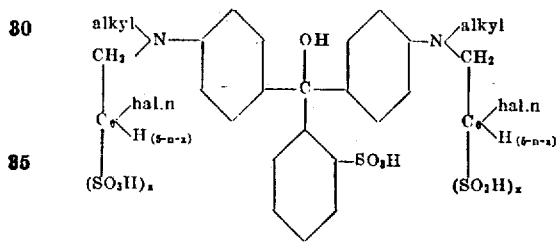

wherein $x$ and $n$ represent numbers less than 3, which dyestuffs are when dry blue powders of a metallic lustre, soluble in water to a beautiful blue solution and dyeing wool in especially pure and clear shades, which dyestuffs may be obtained by condensing one molecular proportion of ortho-sulfobenzaldehyde with two molecular proportions of alkylbenzylarylamins, which are substituted in the benzyl residue by halogens and sulfonic groups, and by oxidizing subsequently the products of condensation.

2. As new compounds green-blue dyestuffs of the triphenylmethan-series, fast to alkali, which are sulfonated and chlorinated derivatives of the dibenzyl-dialkyldiamino-triphenylmethan - ortho - sulfonic acid, corresponding probably in the state of the free acids to the general formula:

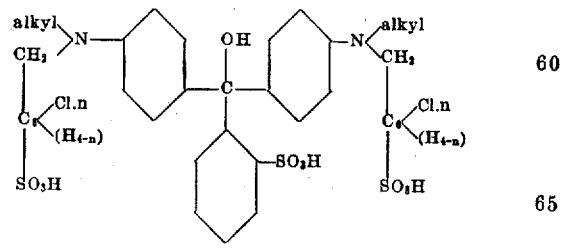

wherein $n$ represent a number less than 3, which dyestuffs are when dry blue powders of a metallic lustre, soluble in water to a beautiful blue solution and dyeing wool in especially pure and clear shades, which dyestuffs may be obtained by condensing one molecular proportion of ortho-sulfobenzaldehyde with two molecular proportions of alkylbenzylarylamins, which are substituted in the benzyl residue by chlorine and sulfonic groups, and by oxidizing subsequently the products of condensation.

3. As new compound a green-blue dyestuff of the triphenylmethan series, fast to alkali, having in the state of the free acid probably the formula:

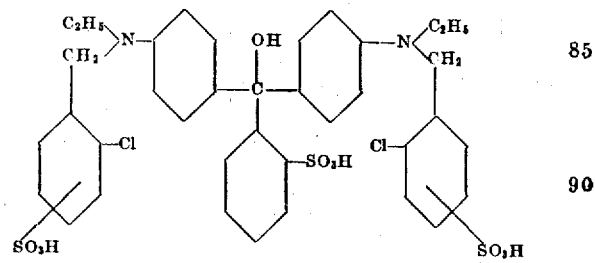

which dyestuff is when dry a blue powder of a metallic lustre, soluble in water to a beautiful blue solution and dyeing wool in especially pure and clear shades, which dyestuff may be obtained by condensing one molecular proportion of ortho-sulfobenzaldehyde with two molecular proportions of ortho - chlorosulfobenzylethylanilin and by oxidizing subsequently the product of condensation.

In testimony, that we claim the foregoing as our invention, we have signed our names, this 11th day of May 1925.

RICHARD GESING.
RUDOLF REYHER.

Certificate of Correction.

It is hereby certified that the name of the assignee in Letters Patent No. 1,550,534, granted August 18, 1925, upon the application of Richard Gesing and Rudolf Reyher, of Offenbach-on-the-Main, Germany, for an improvement in "Green-Blue Dyestuffs of the Triphenylmethane Series, Fast to Alkali," was erroneously written and printed as "Chemische Fabrik Greisheim-Elektron," whereas said name should have been written and printed as *Chemische-Fabrik Griesheim-Elektron*, as shown by the records of assignments in this office; and that the said Letters Patent should be read with this correction therein that the same may conform to the record of the case in the Patent Office.

Signed and sealed this 3d day of November, A. D. 1925.

[SEAL.]

KARL FENNING,
*Acting Commissioner of Patents.*

Certificate of Correction.

It is hereby certified that the name of the assignee in Letters Patent No. 1,550,534, granted August 18, 1925, upon the application of Richard Gesing and Rudolf Reyher, of Offenbach-on-the-Main, Germany, for an improvement in " Green-Blue Dyestuffs of the Triphenylmethane Series, Fast to Alkali," was erroneously written and printed as " Chemische Fabrik Greisheim-Elektron," whereas said name should have been written and printed as *Chemische-Fabrik Griesheim-Elektron.* as shown by the records of assignments in this office; and that the said Letters Patent should be read with this correction therein that the same may conform to the record of the case in the Patent Office.

Signed and sealed this 3d day of November, A. D. 1925.

[SEAL.]
KARL FENNING,
*Acting Commissioner of Patents.*